(12) United States Patent
Wang et al.

(10) Patent No.: US 11,256,909 B2
(45) Date of Patent: Feb. 22, 2022

(54) ELECTRONIC DEVICE AND METHOD FOR PUSHING INFORMATION BASED ON USER EMOTION

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Lin-Hao Wang, Zhengzhou (CN); Jun-Wei Zhang, Zhengzhou (CN); Jun Zhang, Shenzhen (CN); Yi-Tao Kao, New Taipei (TW)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 94 days.

(21) Appl. No.: 16/749,284

(22) Filed: Jan. 22, 2020

(65) Prior Publication Data

US 2021/0064855 A1   Mar. 4, 2021

(30) Foreign Application Priority Data

Aug. 29, 2019   (CN) .......................... 201910810585.6

(51) Int. Cl.
*G06K 9/00* (2006.01)
*G06T 7/38* (2017.01)
*G06T 7/521* (2017.01)

(52) U.S. Cl.
CPC ..... *G06K 9/00302* (2013.01); *G06K 9/00248* (2013.01); *G06T 7/38* (2017.01); *G06T 7/521* (2017.01)

(58) Field of Classification Search
CPC .......... G06K 9/00302; G06K 9/00248; G06K 9/2018; G06K 9/00255; G06T 7/38; G06T 7/521
USPC .......................................................... 382/118
See application file for complete search history.

(56) References Cited

U.S. PATENT DOCUMENTS

| | | | | |
|---|---|---|---|---|
| 2016/0379047 A1* | 12/2016 | Natan | ................ | G06K 9/00302 382/201 |
| 2017/0095721 A1* | 4/2017 | Bleich | .................... | A63B 71/06 |
| 2017/0344713 A1* | 11/2017 | Riistama | ............ | G06K 9/00355 |
| 2019/0253538 A1* | 8/2019 | Li | ......................... | H04N 5/2252 |
| 2019/0295271 A1* | 9/2019 | Xu | ..................... | G06K 9/00275 |
| 2020/0160385 A1* | 5/2020 | Chan | .................. | G06Q 30/0271 |

* cited by examiner

*Primary Examiner* — Ayodeji O Ayotunde
(74) *Attorney, Agent, or Firm* — ScienBiziP, P.C.

(57) ABSTRACT

A method for pushing information based on a user emotion including recordings of behavior habits of the user based on a number of predefined emotions within a predefined time period can be implemented in the disclosed electronic device. Based on each predefined emotion, a proportion of each behavior habit of the user is determined at the predetermined time intervals. The device determines information to be pushed according to a current user emotion and the proportions of the behavior habits of the user corresponding to the current user emotion, and the electronic device is controlled to push the determined information.

11 Claims, 5 Drawing Sheets

| | |
|---|---|
| AB = 2.5 cm<br>BC = 1 cm<br>CD = 1.8 cm | Happiness |
| AB = 2 cm<br>BC = 0.5 cm<br>CD = 1.3 cm | Sadness |
| AB = 2.8 cm<br>BC = 1.3 cm<br>CD = 2.1 cm | Anger |
| AB = 2.3 cm<br>BC = 0.7 cm<br>CD = 1.5 cm | Anxiety |

FIG. 4

ELECTRONIC DEVICE AND METHOD FOR PUSHING INFORMATION BASED ON USER EMOTION

CROSS-REFERENCE TO RELATED APPLICATIONS

This application claims priority to Chinese Patent Application No. 201910810585.6 filed on Aug. 29, 2019, the contents of which are incorporated by reference herein.

FIELD

The subject matter herein generally relates to human-machine interaction, and particularly to an electronic device and a method for pushing information based on a user emotion.

BACKGROUND

Users of smart electronic devices, such as smart phones, personal computers, etc., can receive a lot of information promoted or put forward by providers, such as news, game information, health information, service information, etc. However, if the information pushed by the providers does not match a user emotion, a user experience will be affected.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 4 illustrates a relationship table between relative distances between muscles of a number of predefined parts and a number of predefined emotions.

DETAILED DESCRIPTION

Figure 1:
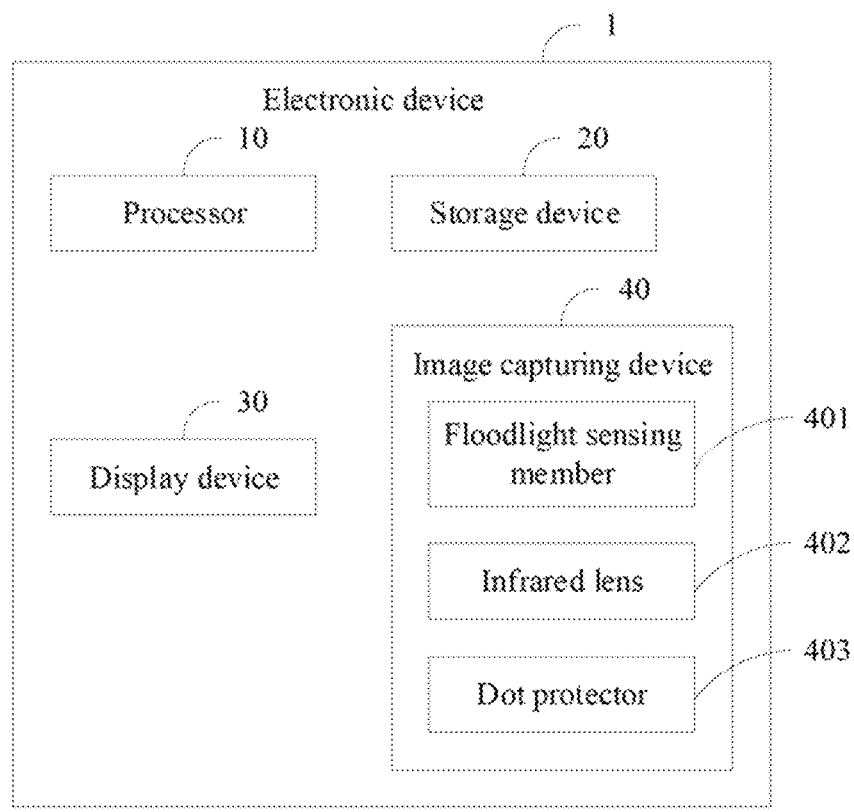
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an electronic device 1 in one embodiment. The electronic device 1 can be a smart phone, a smart watch, or a smart bracelet. The electronic device 1 can recognize user emotions, and push information to the user based on his/her emotions.

The electronic device 1 includes, but is not limited to, a processor 10, a storage device 20, a display device 30, and an image capturing device 40. FIG. 1 illustrates only one example of the electronic device 1. Other examples can include more or fewer components than illustrated or have a different configuration of the various components in other embodiments.

The processor 10 can be a central processing unit (CPU), a microprocessor, or other data processor chip that performs functions in the electronic device 1.

In at least one embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium.

In at least one embodiment, the storage device 20 stores a number of applications installed in the electronic device 1.

In at least one embodiment, the display device 30 can be a touch screen. The display device 30 displays an operation interface of the electronic device 1.

In at least one embodiment, the image capturing device 40 can be a true depth camera. The image capturing device 40 includes, but is not limited to, a floodlight sensing member 401, an infrared lens 402, and a dot projector 403.

When the image capturing device 40 detects that at least one object is approaching, the floodlight sensing member 401 projects infrared light toward the at least one object. The infrared lens 402 receives infrared light reflected by the at least one object, forms an infrared image of the at least one object, and determines whether the at least one object includes a human face. When the at least one object includes a human face, the dot projector 403 projects a number of light dots towards the human face. The infrared lens 402 receives the light dots reflected by the human face and generates a 3D (three-dimensional) image of the human face.

Figure 2:
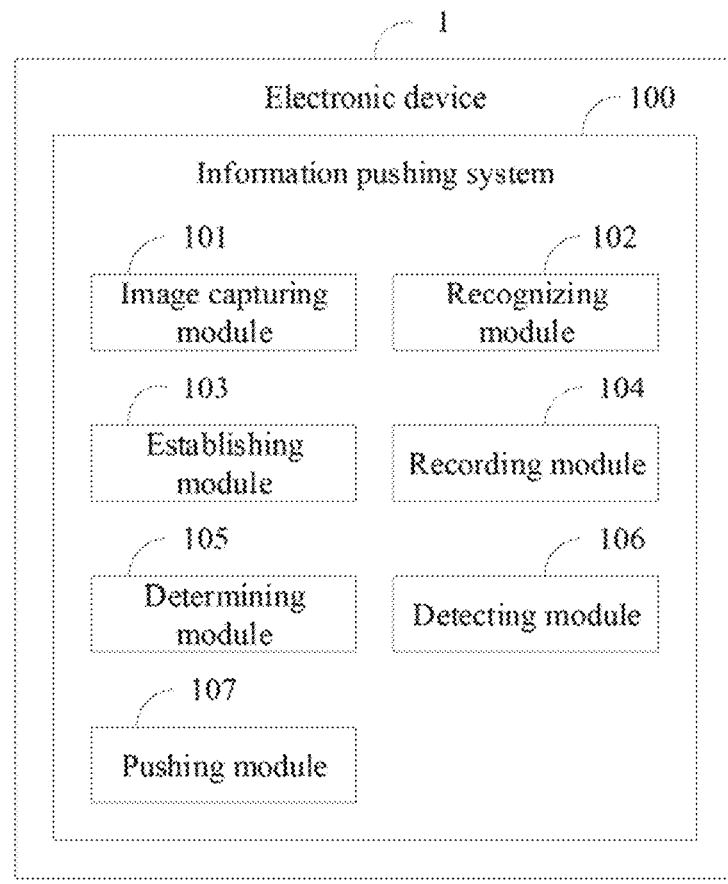
FIG. 2 is a block diagram of an embodiment of modules of an information pushing system in the electronic device of FIG. 1.

As illustrated in FIG. 2, the electronic device 1 runs an information pushing system 100. The information pushing system 100 at least includes an image capturing module 101, a recognizing module 102, an establishing module 103, a recording module 104, a determining module 105, a detecting module 106, and a pushing module 107. The modules 101-107 can be collections of software instructions stored in the storage device 20 of the electronic device 1 and executed by the processor 10. The modules 101-107 also can include functionality represented as hardware or integrated circuits, or as software and hardware combinations, such as a special-purpose processor or a general-purpose processor with special-purpose firmware.

In at least one embodiment, the electronic device 1 can pre-determine a relationship between relative positions of facial muscles of the user and user emotions, according to machine learning and big data analysis.

The image capturing module 101 is used to control the image capturing device 40 to capture a number of 3D images of a user face based on a number of predefined emotions.

In at least one embodiment, when the user is using the electronic device 1, the image capturing module 101 controls the image capturing device 40 to capture the number of 3D images of the user in response to user operations. The image capturing device 40 captures a 3D image based on each of the number of predefined emotions.

In at least one embodiment, the user operations at least include facing the display device 30 and performing at least one expression corresponding to each predefined user emotion. In at least one embodiment, the predefined user emotions at least include happiness, sadness, anger, and anxiety.

When the user faces the display device 30 and makes a facial expression corresponding to a predefined emotion, the image capturing module 101 controls the floodlight sensing member 401 to transmit infrared light to at least one object, and controls the infrared lens 402 to receive the infrared light reflected by the at least one object, and to form an infrared image. The image capturing device 40 is controlled to detect whether the at least one object includes a user face. When the at least one object includes the user face, the image capturing module 101 further controls the dot projector 403 to project a number of light dots to the user face, and controls the infrared lens 402 to receive light spots reflected by the user face, and form an image in a point cloud form including depth data of different positions of the user face. A 3D image of the user based on one of the number of predefined emotions is generated according to the image in the point cloud form.

In detail, the infrared lens 402 determines a number of distances between various parts (e.g. forehead, eyes, cheek, mouth, and chin) of the user face and the image capturing device 40, according to a time interval between transmission of light dots and receiving reflected light dots, and a propagation speed of the light dot. The infrared lens 402 further determines a 3D structure of the user face according to the determined distances between the various parts of the user face and the image capturing device 40. The 3D structure is equal to the depth image of the user face. The infrared lens 402 further generates the 3D image of the user face according to the 3D structure.

In at least one embodiment, the image capturing device 40 can capture the number of 3D images of the user face based on the number of predefined emotions (i.e. happiness, sadness, anger, and anxiety) through above methods.

The recognizing module 102 is used to recognize relative distances between muscles of a number of predefined parts according to each 3D image of the user face captured by the image capturing device 40.

In at least one embodiment, the number of predefined parts at least include a forehead, an eye, a mouth, and a cheekbone.

Figure 3:
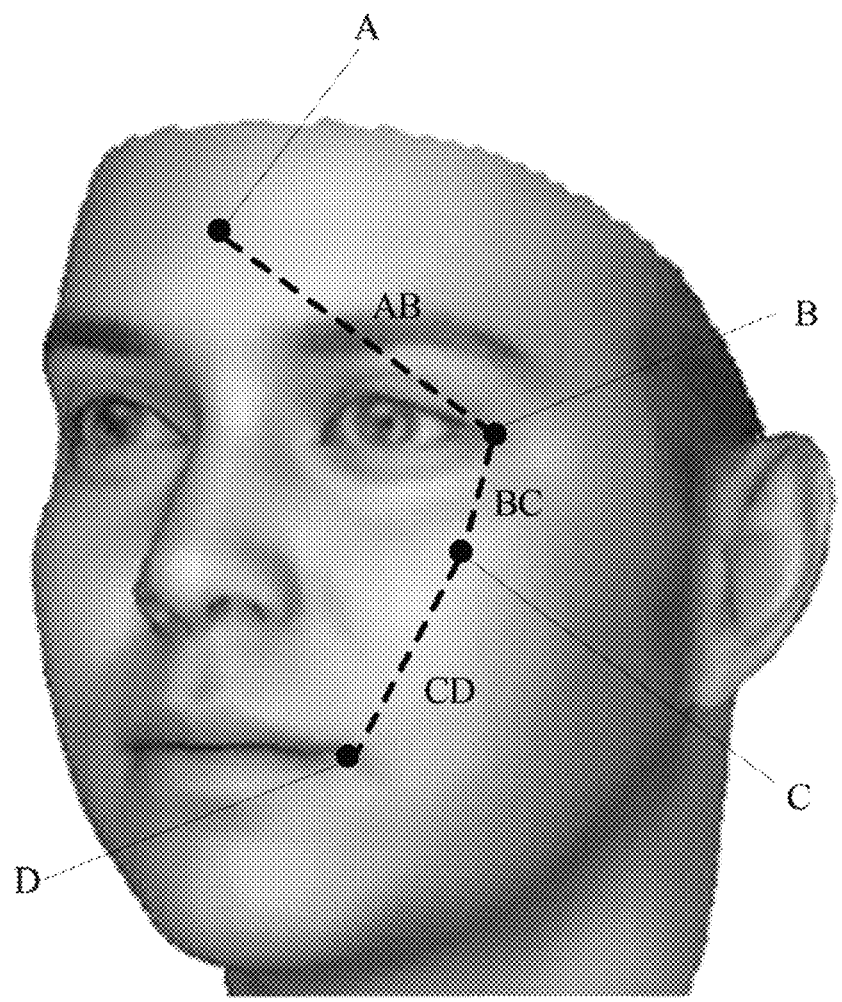
FIG. 3 is a schematic view of an embodiment of a three-dimensional (3D) image of a user face captured by an image capturing device of the electronic device of FIG. 1.

Referring to FIG. 3, the recognizing module 102 determines the forehead A, the eye B, the cheekbone C, and the mouth D in the 3D image of the user face by feature recognition, and calculates a distance AB between the forehead and the eye, a distance BC between the eye and the cheekbone, and a distance CD between the cheekbone and the mouth. The distances AB, BC, and CD are actual distances in the 3D image of the user face between the number of predefined parts.

In at least one embodiment, the relative distances between the muscles of the number of predefined parts represent the relative positions between the muscles of the predefined parts and reflect the user emotions.

The establishing module 103 is used to establish a relationship table between the relative distances between the muscles of the predefined parts and the number of predefined emotions.

Referring to FIG. 4, in at least one embodiment, the establishing module 103 establishes the relationship table by associating each combination of the relative distances between the muscles of the number of predefined parts with a corresponding user emotion, and stores the relationship table to the storage device 20.

For example, when the user emotion is the happiness, the combination of the relative distances includes the distance AB, the distance BC, and the distance CD, the distance AB can be 2.5 cm, the distance BC can be 1 cm, and the distance CD can be 1.8 cm.

In other embodiments, the establishing module 103 can control the image capturing device 40 to capture a number of 3D images of the user face based on each predefined emotion. The recognizing module 102 recognizes a number of combinations of relative distances between the muscles of the number of predefined parts, according to the captured 3D images. The recognizing module 102 further determines a number of ranges of the relative distances based on each predefined emotion according to the number of combinations of relative distances. In at least one embodiment, each range of relative distances is between a minimum value and a maximum value of the relative distances. The establishing module 103 further establishes the relationship table according to the number of ranges of the relative distances.

For example, when the user emotion is the happiness, the number of ranges of the relative distances includes a distance range AB, a distance range BC, and a distance range CD, the distance range AB can be 2.45 cm-2.55 cm] the distance range BC can be 0.95 cm-1.05 cm, and the distance range CD can be 1.75 cm-1.85 cm.

The recording module 104 records behavior habits of the user based on the number of predefined emotions within a predefined time period.

In at least one embodiment, the behavior habits of the user at least include operations performed on the electronic device 1 and actions performed by the user. The predefined time period can be one week. The operations at least include activating an application or using an application.

In at least one embodiment, the image capturing device 40 can detect user actions, such as smoking a cigarette. In detail, the image capturing device 40 can detect the user actions by capturing images and/or videos of the user, and search Internet data using the captured images and/or videos according to big data analysis, thus acquiring a type of the user action, such as the smoking action.

In at least one embodiment, the recording module 104 counts the operations of activating/using the application and the actions performed by the user based on the number of predefined emotions within one week, the behavior habits of the user based on the number of predefined emotions within one week are thus recorded.

The determining module 105 is used to determine a proportion of each behavior habit of the user based on each predefined emotion according to the recorded behavior habits.

For example, when the user emotion is the happiness, a percentage of times of activating/using WeChat is 70%, and a percentage of times of activating/using Weibo is 25%. When the user emotion is the sadness, a percentage of times of activating/using a music application is 65%, and a percentage of times of activating/using a game application is 30%. When the user emotion is the anger, a percentage of times of smoking is 60%, and the percentage of the times of activating/using the music application is 35%. When the user emotion is the anxiety, the percentage of the times of activating/using the music application is 50%, and the percentage of the times of activating/using the game application is 20%.

The detecting module 106 is used to detect a current user emotion at predetermined time intervals.

In at least one embodiment, the predetermined time interval can be thirty minutes. The detecting module 106 detects the current user emotion, by controlling the image capturing device 40 to capture the 3D image of the user face. The detecting module 106 further recognizes the relative distances between the muscles of the number of predefined parts in the 3D image. The detecting module 106 further determines the current user emotion according to the relative distances and the relationship table.

In detail, the relative distances between the muscles of the number of predefined parts in the 3D image forms a combination of distances. The detecting module 106 compares the formed combination of distances with the number of combinations of distances in the relationship table as illustrated in FIG. 4. when the formed combination of distance is equal to one of the number of combinations of distances, or a difference between the formed combination of distances and one of the number of combinations of distances is within a predefined range, the detecting module 106 determines that a predefined emotion corresponding to the combination of distances is the current user emotion, according to the relationship table.

Furthermore, in other embodiments, the electronic device 1 further includes a heart rate sensor (not shown), and the storage device 20 further pre-stores a heart rate range corresponding to each of the number of predefined emotions. The detecting module 106 further controls the heart rate sensor to sense a heart rate of the user at the predetermined time intervals, and determines whether the sensed heart rate is within the heart rate range corresponding to the current user emotion. When determining that the sensed heart rate is within the heart rate range corresponding to the current user emotion, the detecting module 106 confirms that the predefined emotion is the current user emotion.

The determining module 105 is further used to determine information to be pushed by the electronic device 1, according to the current user emotion and the proportion of the behavior habits of the user corresponding to the current user emotion.

In at least one embodiment, the information to be pushed by the electronic device 1 can be determined according to the behavior habit with the highest proportion of the current user emotion. In detail, when the behavior habit with the highest proportion of the current user emotion is activating/using an application, the determining module 105 determines the application as the information to be pushed, and activates the application. For example, if the detecting module 106 detects that the current user emotion is the happiness, the determining module 105 determines that WeChat is the information to be pushed, and activates WeChat.

When the behavior habit with the highest proportion of the current user emotion is an action performed by the user, the determining module 105 determines that a voice information for prompting the user to perform the action should be the information to be pushed.

In other embodiments, the determining module 105 can further determine whether the action to be performed is beneficial to the user. When the action is beneficial to the user, the determining module 105 determines the voice information for prompting the user to perform the action is the information to be pushed.

When the action is not beneficial to the user, the determining module 105 further determines whether the behavior habit with the second highest proportion of the current user emotion is activating/using a certain application or an action performed by the user. When the determined behavior habit is activating/using such application, the determining module 150 determines that the application and the voice message for prompting the user not to perform the action are the information to be pushed.

For example, if the user current emotion is the anger, the determining module 105 determines that the music application and the voice prompt "Smoking is harmful, you should listen to music" as the information to be pushed. When the determined behavior habit is the action performed by the user, the above process is repeated.

The pushing module 107 is used to control the electronic device 1 to push the information determined by the determining module 105.

For example, when the determined information is the WeChat application, the pushing module 107 pushes the WeChat application, that is, activates the WeChat application. When the determined information is the music application and the voice prompt "Smoking is harmful, you should listen to music", the pushing module 107 pushes the music application, that is, activates the music application, and controls the electronic device 1 to output such voice prompt.

In other embodiments, the detecting module 106 is further used to determine a user emotion when the user is accessing an application. If the user emotion when accessing the application is detected to be the happiness, the pushing module 107 pushes the information with similar content as the accessed content. For example, when the user is browsing merchandise via a shopping application, and the detecting module 106 detects that the user emotion is the happiness, the pushing module 107 pushes similar merchandises to the user, thereby providing more choices to the user.

In other embodiments, the image capturing device 40 can be exposed to an external environment. When a face of a person around the user enters a capturing range of the image capturing device 40, the detecting module 106 detects the emotion of the person. If the emotion (e.g. anger and anxiety) of the person has a potential threat to the user, the pushing module 107 pushes a prompt message to prompt the user to pay attention. The prompt information can be popup information or vibration.

Figure 5:
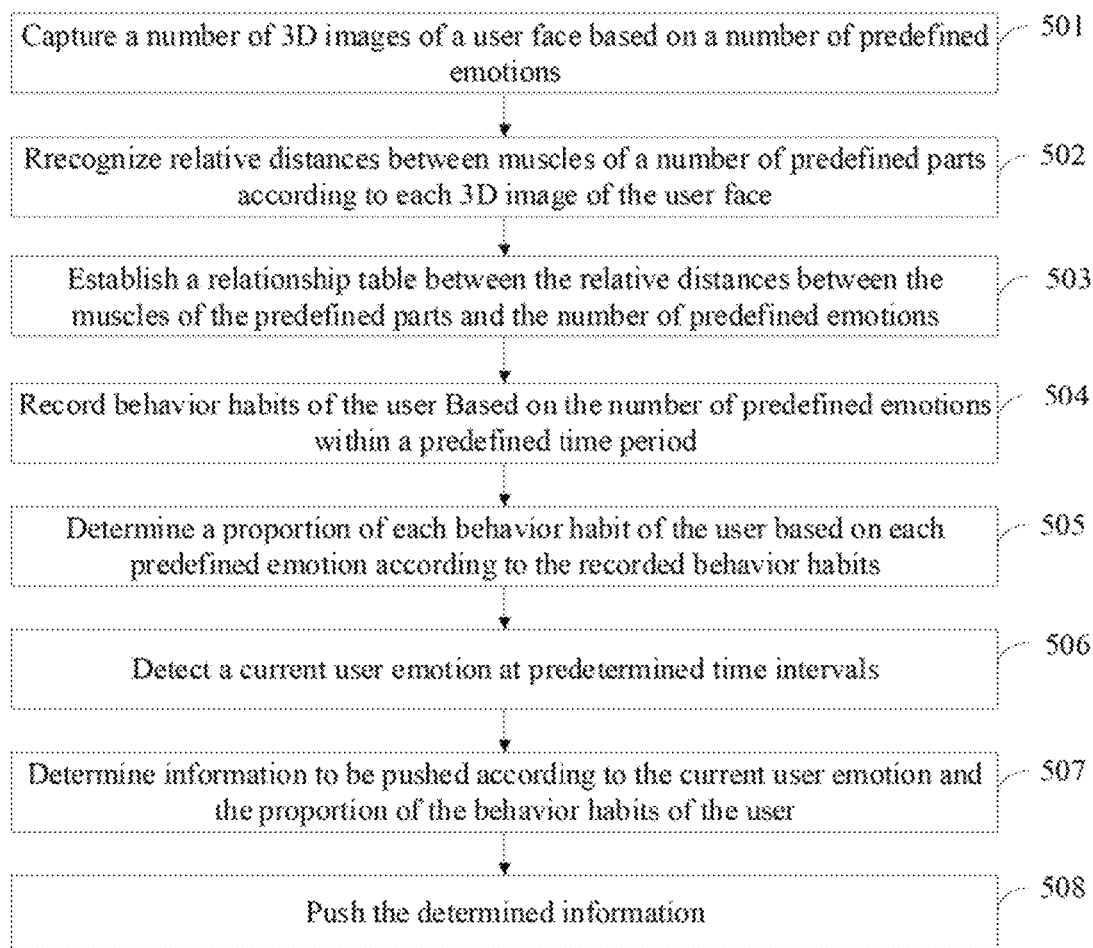
FIG. 5 illustrates a flowchart of an embodiment of a method for pushing information based on a user emotion.

FIG. 5 illustrates a flowchart of an embodiment of a method for pushing information based on a user emotion. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 501.

At block 501, the image capturing module 101 controls the image capturing device 40 to capture a number of 3D images of a user face based on a number of predefined emotions.

At block 502, the recognizing module 102 recognizes relative distances between muscles of a number of predefined parts according to each 3D image of the user face captured by the image capturing device 40.

At block 503, the establishing module 103 establishes a relationship table between the relative distances between the muscles of the predefined parts and the number of predefined emotions.

At block 504, the recording module 104 records behavior habits of the user based on the number of predefined emotions within a predefined time period.

At block 505, the determining module 105 determines a proportion of each behavior habit of the user based on each predefined emotion according to the recorded behavior habits.

At block 506, the detecting module 106 detects a current user emotion at predetermined time intervals.

At block 507, the determining module 105 further determines information to be pushed by the electronic device 1 according to the current user emotion and the proportion of the behavior habits of the user corresponding to the current user emotion.

At block 508, the pushing module 107 controls the electronic device 1 to push the information determined by the determining module 105.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor;
an image capturing device coupled to the at least one processor; and
a storage device coupled to the at least one processor and storing instructions for execution by the at least one processor to cause the at least one processor to:
control the image capturing device to capture a plurality of 3D images of a user face based on a plurality of predefined emotions;
recognize relative distances between muscles of a plurality of predefined parts according to each of the plurality of 3D images of the user face captured by the image capturing device;
establish a relationship table between the relative distances between the muscles of the plurality of predefined parts and the plurality of predefined emotions;
record behavior habits of a user based on the plurality of predefined emotions within a predefined time period;
determine a proportion of each of the behavior habits of a user based on each of the plurality of predefined emotions according to the recorded behavior habits;
detect a current user emotion at predetermined time intervals according to the recognized relative distances and the relationship table;
determine information to be pushed related to one of the behavior habits by the electronic device according to the current user emotion and the proportion of each of the behavior habits of the user corresponding to the current user emotion; and
control the electronic device to push the determined information.

2. The electronic device according to claim 1, wherein the at least one processor is further caused to:
control the image capturing device to capture the plurality of 3D images of a user face; and
recognize the relative distances between the muscles of the plurality of predefined parts in the 3D image.

3. The electronic device according to claim 2, wherein the plurality of predefined parts comprise a forehead, an eye, a mouth, and a cheekbone; wherein the at least one processor is further caused to:
determine the forehead, the eye, the cheekbone, and the mouth in the 3D image of the user face by feature recognition; and
calculate a distance between the forehead and the eye, a distance between the eye and the cheekbone, and a distance between the cheekbone and the mouth.

4. The electronic device according to claim 1, wherein the at least one processor is further caused to:
associate each combination of the relative distances between muscles of the plurality of predefined parts with a corresponding user emotion; and
store the relationship table to the storage device.

5. The electronic device according to claim 1, wherein the image capturing device comprises a floodlight sensing member, an infrared lens, and a dot projector.

6. The electronic device according to claim 5, wherein the at least one processor is further caused to:
control the floodlight sensing member to transmit infrared lights to at least one object;
control the infrared lens to receive infrared lights reflected by the at least one object and to form an infrared image;
control the image capturing device to detect whether the at least one object includes a user face; wherein when the at least one object includes the user face, the at least one processor is further caused to:
control the dot projector to project a plurality of light dots towards the user face;
control the infrared lens to receive the light spots reflected by the user face and form an image in a point cloud form including depth data of different positions of the user face; and
generate a 3D image of the user face based on one of the plurality of predefined emotions according to the image in the point cloud form.

7. A method for pushing information based on a user emotion implemented in an electronic device comprising:
- controlling an image capturing device to capture a plurality of 3D images of a user face based on a plurality of predefined emotions;
- recognizing relative distances between muscles of a plurality of predefined parts according to each of the plurality of 3D images of the user face captured by the image capturing device;
- establishing a relationship table between the relative distances between the muscles of the plurality of predefined parts and the plurality of predefined emotions;
- recording behavior habits of a user based on the plurality of predefined emotions within a predefined time period;
- determining a proportion of each of the behavior habits of a user based on each of the plurality of predefined emotions according to the recorded behavior habits;
- detecting a current user emotion at predetermined time intervals according to the recognized relative distances and the relationship table;
- determining information to be pushed related to one of the behavior habits by the electronic device according to the current user emotion and the proportion of each of the behavior habits of the user corresponding to the current user emotion; and
- controlling the electronic device to push the determined information.

8. The method according to claim 7, further comprising:
- controlling the image capturing device to capture the plurality of 3D images of a user face; and
- recognizing the relative distances between the muscles of the plurality of predefined parts in the 3D image.

9. The method according to claim 8, wherein the plurality of predefined parts comprise a forehead, an eye, a mouth, and a cheekbone, and the method of recognizing the relative distances between the muscles of the plurality of predefined parts in the 3D image comprises:
- determining the forehead, the eye, the cheekbone, and the mouth in the 3D image of the user face by feature recognition; and
- calculating a distance between the forehead and the eye, a distance between the eye and the cheekbone, and a distance between the cheekbone and the mouth.

10. The method according to claim 7, wherein the method of capturing a plurality of 3D images of a user face based on the plurality of predefined emotions comprises:
- controlling a flood light sensing member to transmit infrared lights to at least one object;
- controlling an infrared lens to receive infrared lights reflected by the at least one object and to form an infrared image;
- controlling the image capturing device to detect whether the at least one object includes a user face; wherein when the at least one object comprises a user face, the method of capturing a plurality of 3D images of a user face based on the plurality of predefined emotions further comprises:
- controlling a dot projector to project a plurality of light dots towards the user face;
- controlling the infrared lens to receive the light spots reflected by the user face and form an image in point cloud form including depth data of different positions of the user face; and
- generating a 3D image of the user face according to the image in the point cloud form.

11. The method according to claim 7, wherein the method of establishing a relationship table between the relative distances between the muscles of the plurality of predefined parts and the plurality of predefined emotions comprises:
- associating each combination of the relative distances between muscles of the plurality of predefined parts with a corresponding user emotion; and
- storing the relationship table to the storage device.

* * * * *